United States Patent [19]
Scott et al.

[11] 3,800,161
[45] Mar. 26, 1974

[54] PORTABLE DYNAMIC MULTISTATION PHOTOMETER-FLUOROMETER

[75] Inventors: Charles D. Scott, Oak Ridge; Eddie L. Collins, Jefferson City, both of Tenn.

[73] Assignee: The United States of America as represented by the United States Atomic Energy Commission, Washington, D.C.

[22] Filed: Dec. 19, 1972

[21] Appl. No.: 316,628

[52] U.S. Cl.............. 250/564, 250/227, 250/458, 25/253 R, 356/180, 250/576
[51] Int. Cl. .......................................... G01n 21/26
[58] Field of Search .......... 250/218, 227, 458, 461; 356/180, 181, 246, 197; 23/252 R, 253 R

[56] References Cited
UNITED STATES PATENTS

| | | | |
|---|---|---|---|
| 3,101,411 | 8/1963 | Richards | 250/227 X |
| 3,418,053 | 12/1968 | Pelavin | 356/246 |
| 3,497,694 | 2/1970 | Jura et al. | 250/227 X |
| 3,510,667 | 5/1970 | Cleveland et al. | 250/227 |
| 3,555,284 | 12/1968 | Anderson | 23/252 X |

*Primary Examiner*—Walter Stolwein
*Attorney, Agent, or Firm*—John A. Horan

[57] ABSTRACT

A compact fast analyzer having a self-contained power supply is provided for simultaneously determining concentrations in a multiplicity of discrete samples using either photometric or fluorometric measurement techniques and rotors defining rotary cuvette systems. A multi-position pivoted optical head assembly supports means for directing light into sample holding cuvettes as they rotate. The optical head assembly selectively positions the means for directing light at an appropriate angle depending upon whether photometric or fluorometric measurements are being made. Means, selectively operable during a fluorometric measurement, for transmitting fluorescence emitted by samples within the cuvettes to a photodetector is also supported and selectively positioned by the opitcal head assembly. Means, selectively operable during a photometric measurement, is provided for transmitting light which passes through the cuvettes during a photometric measurement to the same photodetector.

9 Claims, 6 Drawing Figures

3,800,161

PORTABLE DYNAMIC MULTISTATION PHOTOMETER-FLUOROMETER

BACKGROUND OF THE INVENTION

The invention relates generally to concentration measuring instruments and more particularly to a compact fast analyzer of the rotary cuvette type which is suitable for making either photometric or fluorometric measurements. It was made in the course of, or under, a contract with the U.S. Atomic Energy Commission.

A representative fast analyzer of the rotary cuvette type is described in U.S. Pat. No. 3,555,284 issued to common assignee on Jan. 12, 1971. In the fast analyzer described in that patent, acceleration forces associated with rotation are used to transfer and mix samples and reagents in a multi-cuvette rotor. A stationary photometer scans the cuvettes during rotation. The signals thus generated are evaluated by a computer, allowing the reactions taking place in the respective cuvettes to be observed as they occur. Since all reactions are initiated simultaneously and are coupled with the continuous referencing of the spectrophotometric system of the analyzer, errors due to electronic, mechanical, or chemical drift are minimized.

Although analyzers built in accordance with the aforementioned patent have been highly successful in that they operate with relatively low sample and reagent volume requirements, have demonstrated a high sample analysis rate, and are suitable for automated operation, further improvement is still desirable. For example, the cuvette rotor described in that patent is a relatively large and complex structure of glass and polytetrafluorethylene rings sandwiched together and secured between a steel rotor body and bolted flange ring. Such rotors are expensive and must be cleaned between analytical runs to avoid contamination of subsequent samples. Correspondingly large cabinetry, drive motors, etc., must be used with the rotor with the result that the fast analyzer is not portable and requires a relatively large amount of valuable laboratory space.

A further reduction in sample and reagent volume requirements is also desirable to reduce the use of expensive reagents and to make the analyzer useful in testing applications, such as a pediatric laboratory, where it is difficult to obtain a sufficient volume of sample for analysis. In addition, dual-purpose operation permitting photometric and fluorometric measurements to be made in the same analyzer would significantly extend the usefulness of the patented analyzer by eliminating the need to have two single-purpose analyzers where the capability to perform both measurements is desired.

It is, accordingly, a general object of the invention to provide a compact portable fast analyzer capable of performing both photometric and fluorometric measurements.

Other objects of the invention will be apparent upon examination of the following written description and the appended drawings.

SUMMARY OF THE INVENTION

In accordance with the invention a compact fast analyzer having a self-contained power supply is provided for simultaneously determining concentrations in a multiplicity of discrete samples using either photometric or fluorometric measurement techniques and rotors defining rotary cuvette systems. A multi-position pivoted optical head assembly supports means for directing light into sample holding cuvettes as they rotate. The optical head assembly selectively positions the means for directing light at an appropriate angle depending upon whether photometric or fluorometric measurements are being made. Means, selectively operable during a fluorometric measurement, for transmitting fluorescence emitted by samples within the cuvettes to a photodetector is also supported and selectively positioned by the optical head assembly. Means, selectively operable during a photometric measurement, is provided for transmitting light which passes through the cuvettes during a photometric measurement to the same photodetector. The compact size and self-contained power supply of the fast analyzer make it highly portable and amenable to field use where utilities and laboratory space are lacking. Flexibility of operation results from the dual purpose capability of the analyzer for making both photometric and fluorometric measurements.

DETAILED DESCRIPTION OF EMBODIMENTS

Figure 1:
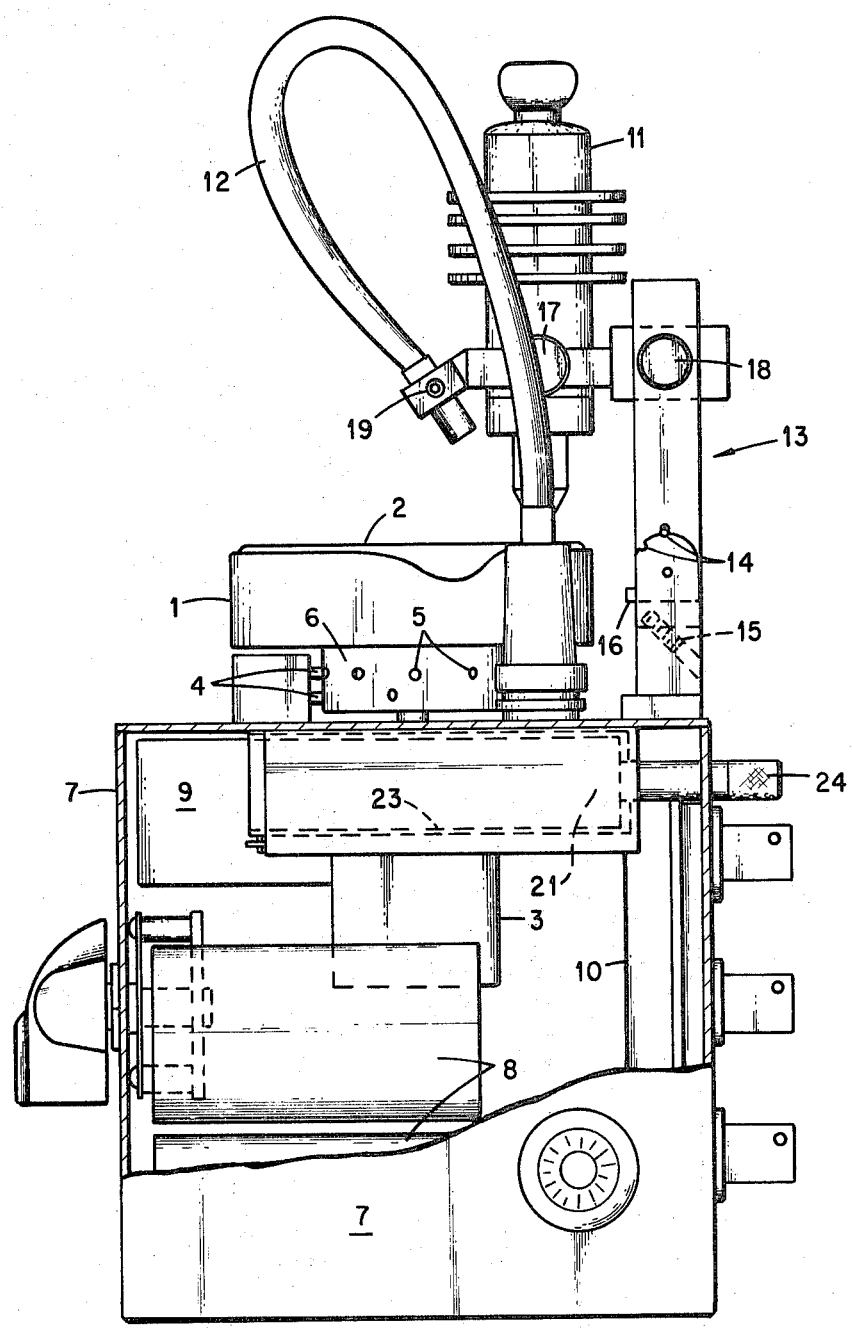
FIG. 1 is a side view, partially cut away, showing a fast analyzer made in accordance with the invention.
Figure 2:
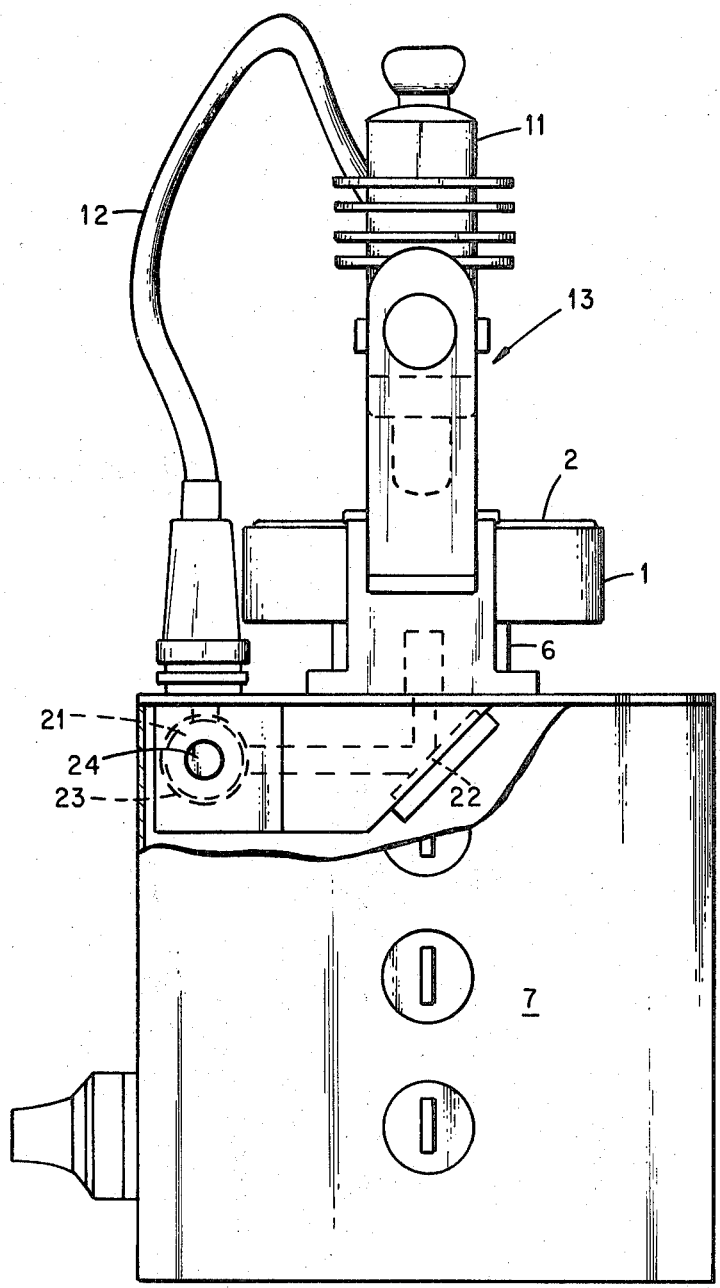
FIG. 2 is a back view of the fast analyzer of FIG. 1.

Referring now to the drawings, initially to FIGS. 1 and 2, a fast analyzer made in accordance with the invention includes a rimmed turntable 1 for holding a rotor 2 defining a rotary cuvette system. Turntable 1 is rotatable, by means of motor 3, through a stationary optics system at speeds up to 1,000 rpm. Signals obtained as the sample holding cuvettes pass through the optical system are synchronized for data output purposes by means of stationary brushes 4 which contact conducting surfaces 5 spaced about the periphery of a commutator disk 6 attached to the base of turntable 1 and rotatable therewith. A cube-shaped cabinet 7 measuring about 4 inches on each side encloses motor 3 and serves as a mounting surface for turntable 1. As shown, dry cell batteries 8 are mounted within cabinet 7 making the analyzer completely portable. Batteries 8 power motor 3, high voltage power supply 9, electronic module 10, and a light source disposed within housing 11.

An optical head comprises a light source and filter disposed within housing 11 and a flexible light pipe 12. Housing 11 and light pipe 12, which is typically fabricated from Lucite filaments or other light conducting material often referred to as fiber optics, are mounted on a support 13 hinged to the top of cabinet 7. Support 13 contains a three-position detent means 14 which permits the light source to be positioned normal to the cuvette rotor in alignment with the cuvettes in a photometric measurement mode as shown in FIGS. 1 and 2, at an angle of about 45° from vertical in a photometric measurement mode, or in a retracted position to facilitate rotor placement upon turntable 1. A fine adjustment screw 15 engages detent 16 to facilitate exact positioning of the optical head during the fluorometric mode of operation. Setscrews 17 and 18 permit axial and lateral adjustment of housing 11 to align the light source with the cuvettes in rotor 2. An additional adjustment of light pipe 12 is facilitated by setscrew 19. Photodetecting means in the form of a photomultiplier tube 21 is located within cabinet 7 in alignment with the exit end of light pipe 12. With the analyzer operating in the fluorometric mode, fluorescence emitted by samples in the cuvettes passes through light pipe 12 to photomultiplier tube 21 which provides an output signal proportional to the fluorescence detected. When operating in the photometric mode, light transmitted through the cuvettes is reflected against photomultiplier tube 21 by means of inclined mirror 22 positioned below the rotor in alignment with the light source in housing 11. Alternatively, mirror 22 may be replaced with a light pipe having a light receiving end below rotor 2 in alignment with the light source in housing 11 and a light discharge end adjacent photomultiplier tube 21. Such arrangement would add flexibility to the positioning of the photomultiplier tube since the light pipe could be curved and extended as necessary. A cylindrical sleeve 23, defining a window to permit light passage therethrough, encompasses photomultiplier tube 21. Sleeve 23 is manually rotatable by means of knob 24 to selectively admit light transmitted through light pipe 12 or reflected from mirror 22.

Figure 3:
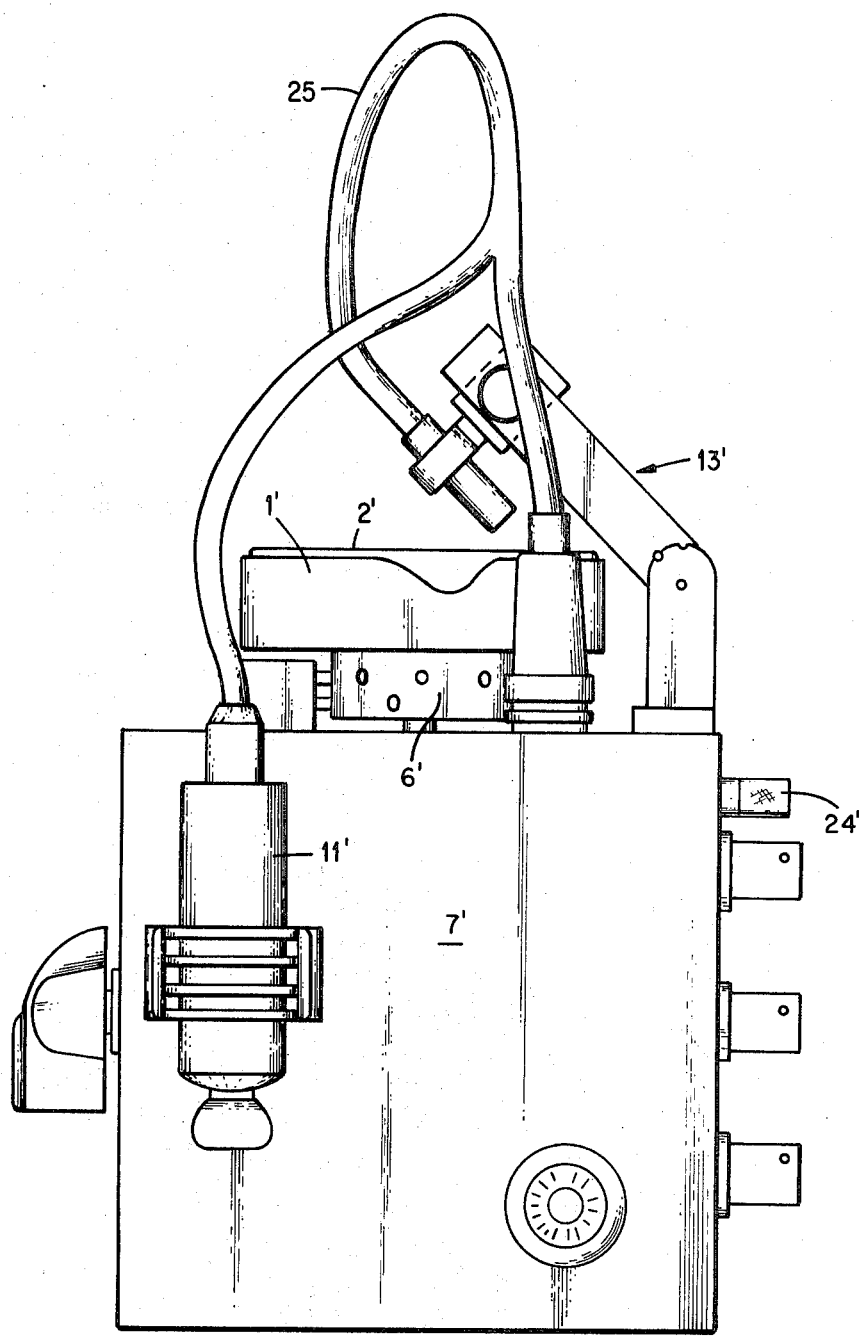
FIG. 3 is a side view of an alternative embodiment of the invention utilizing a light pipe to transmit light from a remote light source to the cuvettes.

Referring now to FIG. 3, an alternative analyzer embodiment is illustrated wherein the light source and housing are removed from support 13' and positioned remotely. As shown, housing 11' containing a light source may be conveniently clipped to the side of cabinet 7'. Other remote locations including locations within cabinet 7' may also be used without departing from the scope of the invention, however. A bifurcated light pipe 25 is supported at its unitary end by support 13' and communicates at its bifurcated ends with the light source in housing 11' and with a photomultiplier tube (not shown) in a manner similar to that described in reference to light pipe 12 in FIGS. 1 and 2. Light pipe 25 transmits light bidirectionally: fluorescence is transmitted from the cuvettes to the photomultiplier tube and light from the light source in housing 11' is transmitted to the cuvettes for fluorometric or photometric measurements. That portion of light pipe 25 which transmits fluorescence does not function during photometric measurements, however, since, in that case, the light is transmitted through the cuvettes and reflected to the photomultiplier tube as described in reference to FIGS. 1 and 2.

Figure 4:
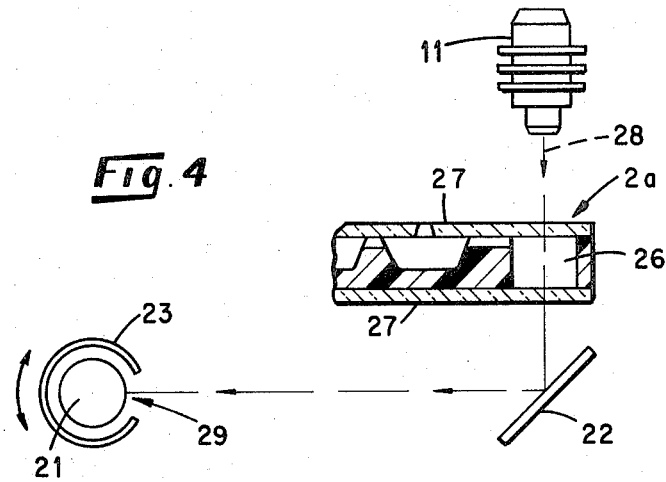
FIG. 4 is a schematic diagram illustrating operation of the fast analyzer in making photometric measurements.
Figure 5:
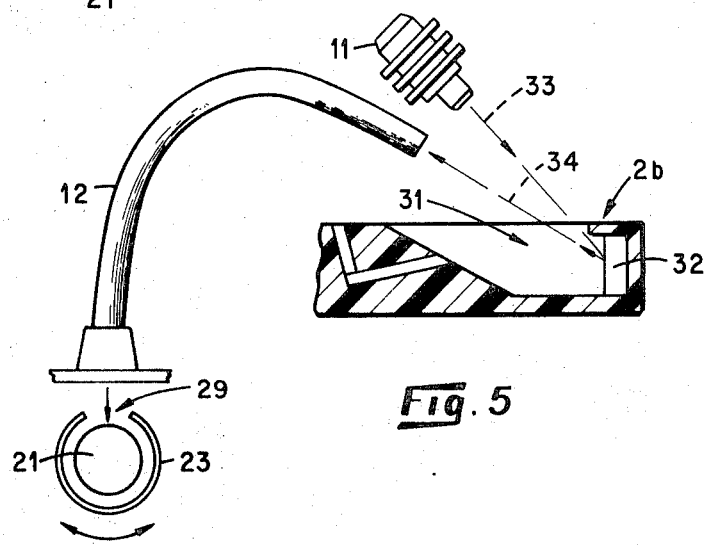
FIG. 5 is a schematic diagram illustrating operation of the fast analyzer in making fluorometric measurements.
Figure 6:
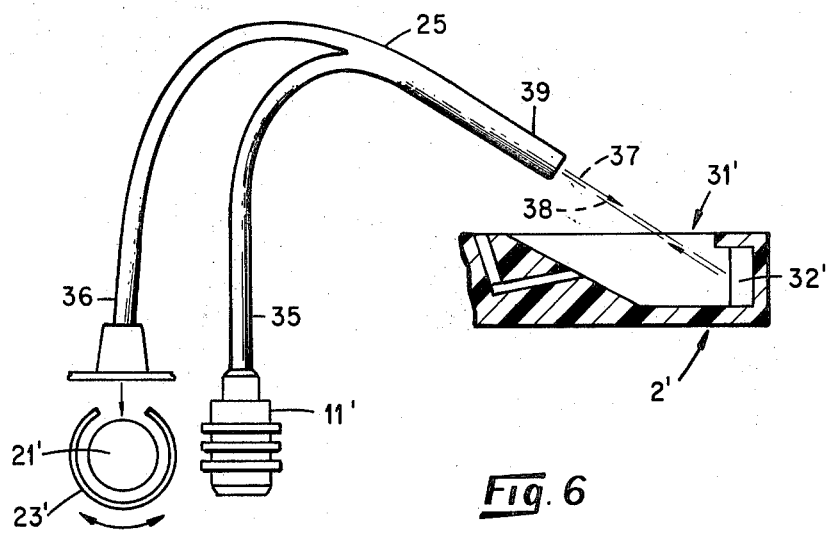
FIG. 6 schematically illustrates the operation of the fast analyzer shown in FIG. 3 during a fluorometric measurement.

Operation of the analyzers of FIGS. 1-3 is schematically illustrated in FIGS. 4-6. FIG. 4 shows the photometric mode of operation as it is practiced in the analyzer of FIGS. 1 and 2. As shown, housing 11 is aligned with sample analysis cuvettes 26 in rotor 2a. Transparent plates 27 on each side of the rotor permit light beam 28 emitted from the housing to pass completely through the rotor and sample in the cuvette. The transmitted light is reflected from mirror 22 to photomultiplier tube 21 which provides an output signal proportional to the light which it detects. Sleeve 23 is shown rotated to a position where window 29 admits the reflected light to the photomultiplier tube. Disposable rotors suitable for use in making photometric measurements in the present analyzer are described in detail in copending application Ser. No. 295,780, of common assignee.

FIG. 5 also relates to the analyzer of FIGS. 1 and 2 with the analyzer operating in the fluorometric rather than the photometric mode. As shown, rotor 2b, which is interchangeable with rotor 2a shown in FIG. 4, is fundamentally different from that rotor with the cavity 31 for receiving sample 32 being open ended to facilitate the passage of an inclined excitation light beam 33 and emitted fluorescence beam 34. The proper inclination of light beam 33 and light pipe 12 is achieved by inclining support 13 which supports housing 11 and the light pipe as described above in reference to FIGS. 1 and 2. The emitted fluorescence is transmitted through light pipe 12 to photodetector 21 which provides a signal proportional to the light detected. Sleeve 23 is shown rotated to a position where window 29 admits the light passing from light pipe 12 to photomultiplier tube 21. A more detailed description of rotors suitable for making fluorometric measurements in the present analyzer is contained in copending patent application Ser. No. 310,614, of common assignee.

Referring now to FIG. 6, operation of the analyzer of FIG. 3 is illustrated in the flurometric mode. The bifurcated ends 35 and 36 of light pipe 25 are shown in communication with a light source in housing 11' and with photomultiplier tube 21'. Excitation light passes from the source in housing 11' through the light pipe and is emitted as excitation light beam 37 impinging on sample 32'. Fluorescence 38 emitted by the sample is transmitted back through the light pipe to photomultiplier tube 21'. Alternatively, operation in the photometric mode may be achieved by replacing the rotor shown with one suitable for photometric measurements as shown in FIG. 4, placing the unitary end 39 of light pipe 25 in a vertical orientation and in alignment with the cuvettes of the replacement photometric rotor by appropriate adjustment of support 13' shown in FIG. 3, and rotating sleeve 23' to align the window therein to receive light reflected from mirror 22'.

The above description of two embodiments of the invention should not be interpreted in a limiting sense. For example, alternative means for synchronizing the output of the photomultiplier tube with the cuvettes in the rotor could be used without departing from the scope of the invention. It is intended, rather, that the invention be limited only by the scope of the appended claims.

What is claimed is:

1. A compact fast analyzer of the rotary cuvette type suitable for selectively making both photometric and fluorometric analyses on a multiplicity of samples comprising:

a. a cabinet;

b. a motor turntable rotatably mounted on top of said cabinet, said turntable having a flat base portion defining a circular array of axially extending apertures equally spaced from the center of rotation of said turntable;

c. a removable cuvette rotor defining a circular array of sample analysis cuvettes disposed on said turntable and rotatable therewith;

d. an adjustable, articulated, multi-position bracket mounted on said cabinet adjacent said turntable;

e. a light source supported above said turntable and cuvette rotor by said bracket, said light source being positioned by said bracket to project light into said sample analysis cuvettes;

f. a photodetector;

g. means, disposed below said rotor and turntable, for transmitting light which passes through said cuvettes and said axially extending apertures in said flat base portion of said turntable to said photodetector;

h. a light pipe having a light receiving end and a light discharging end, said light receiving end being supported by said bracket in a position adjacent said cuvettes so as to receive fluorescence emitted by samples within said cuvettes during a fluorometric analysis of said samples, said light discharging end being disposed adjacent said photodetector; and i. means for selectively exposing said photodetector to light discharging from said light pipe and to light transmitted by said means for transmitting light which passes through said cuvettes and said axially extending apertures in said flat portion of said turntable.

2. The fast analyzer of claim 1 further including a self-contained power source.

3. The fast analyzer of claim 1 wherein said means for transmitting light which passes through said cuvettes and said apertures in said flat base portion comprises a mirror inclined to reflect light which passes through said cuvettes and said apertures to said photodetector.

4. The fast analyzer of claim 1 wherein said means for selectively exposing said photodetector to light discharging from said light pipe and to light transmitted by said means for transmitting light which passes through said cuvettes and said axially extending apertures in said flat base portion of said turntable comprises a manually rotatable cylindrical sleeve disposed about said photodetector, said sleeve defining an open window portion for selectively permitting light passage through said sleeve to said photodetector.

5. A compact fast analyzer of the rotary cuvette type suitable for selectively making both photometric and fluorometric analyses on a multiplicity of samples comprising;

a. a cabinet;

b. a motor driven turntable rotatably mounted on top of said cabinet, said turntable having a flat base portion defining a circular array of axially extending apertures equally spaced from the center of rotation of said turntable;

c. a removable cuvette rotor defining a circular array of sample analysis cuvettes disposed in said turntable and rotatable therewith;

d. an adjustable, articulated, multi-position bracket mounted on said cabinet adjacent said turntable;

e. a light source secured to said cabinet;

f. a photodetector;

g. means, disposed below said rotor and turntable, for transmitting light which passes through said cuvettes and said axially extending apertures in said flat base portion of said turntable to said photodetector;

h. a light pipe having unitary and bifurcated end portions, said unitary end portion being supported by said bracket in a position adjacent said cuvettes to project light into said cuvettes and to receive fluorescence emitted by samples within said cuvettes during a fluorometric analysis of said samples, said bifurcated end portions being disposed adjacent said light source and said photodetector, respectively; and i. means for selectively exposing said photodetector to light discharging from said bifurcated end of said light pipe disposed adjacent said photodetector and to light transmitted by said means for transmitting light which passes through said cuvettes and said axially extending apertures in said flat base portion of said turntable.

6. The fast analyzer of claim 5 further including a self-contained power source.

7. The fast analyzer of claim 5 wherein said means for transmitting light which passes through said cuvettes and said apertures in said flat base portion comprises a mirror inclined to reflect light which passes through said cuvettes and said apertures to said photodetector.

8. The fast analyzer of claim 5 wherein said means for selectively exposing said photodetector to light discharging from said bifurcated end of said light pipe disposed adjacent said photodetector and to light transmitted by said means for transmitting light which passes through said cuvettes and said axially extending apertures in said flat base portion of said turntable comprises a manually rotatable cylindrical sleeve disposed about said photodetector, said sleeve defining an open window portion for selectively permitting light passage through said sleeve to said photodetector.

9. The fast analyzer of claim 5 further including a disk-shaped commutator disposed below and rotatable with said turntable, said commutator having a series of spaced-apart conducting surfaces; and a fixed brush assembly fixed to said cabinet adjacent said commutator, said brush assembly having at least one brush for contacting said conducting surfaces on said commutator and thereby providing synchronization signals correlating the output of said photodetector with respective cuvettes in said array of sample analysis cuvettes.

* * * * *

UNITED STATES PATENT OFFICE
CERTIFICATE OF CORRECTION

Patent No. 3,800,161          Dated    March 26, 1974

Inventor(s)   Charles D. Scott et al.

It is certified that error appears in the above-identified patent and that said Letters Patent are hereby corrected as shown below:

In the Abstract, line 15, "opitcal" should read -- optical --.

Column 4, line 29, "flurometric" should read -- fluorometric --; line 60, after "motor" insert -- driven --.

Column 5, line 23, after "flat" insert -- base --.

Signed and sealed this 10th day of September 1974.

(SEAL)
Attest:

McCOY M. GIBSON, JR.            C. MARSHALL DANN
Attesting Officer               Commissioner of Patents